US009097556B2

(12) United States Patent
Grosjean et al.

(10) Patent No.: US 9,097,556 B2
(45) Date of Patent: Aug. 4, 2015

(54) METHOD FOR REDUCING NON-LINEARITY DURING MEASUREMENT OF A PHYSICAL PARAMETER AND ELECTRONIC CIRCUIT FOR IMPLEMENTING THE SAME

(75) Inventors: Sylvain Grosjean, Les Fins (FR); Alexandre Deschildre, Marin (CH)

(73) Assignee: EM Microelectronic-Marin S.A., Marin (CH)

( * ) Notice: Subject to any disclaimer, the term of this patent is extended or adjusted under 35 U.S.C. 154(b) by 594 days.

(21) Appl. No.: 13/534,405

(22) Filed: Jun. 27, 2012

(65) Prior Publication Data

US 2013/0006559 A1 Jan. 3, 2013

(30) Foreign Application Priority Data

Jul. 1, 2011 (EP) .................................. 11172424

(51) Int. Cl.
*G01D 3/032* (2006.01)
*G01D 5/241* (2006.01)
*G01L 1/14* (2006.01)
*G01P 15/125* (2006.01)
*G01P 15/18* (2013.01)

(52) U.S. Cl.
CPC .............. *G01D 3/032* (2013.01); *G01D 5/241* (2013.01); *G01L 1/144* (2013.01); *G01P 15/125* (2013.01); *G01P 15/18* (2013.01)

(58) Field of Classification Search
CPC ..................................................... G01D 3/032
USPC ............................................................ 702/65
See application file for complete search history.

(56) References Cited

U.S. PATENT DOCUMENTS

| 3,848,195 | A | * | 11/1974 | Kiko .............................. 330/261 |
| 2006/0162454 | A1 | | 7/2006 | Manninen |
| 2007/0216423 | A1 | | 9/2007 | Grosjean et al. |
| 2009/0121769 | A1 | | 5/2009 | Baus |

(Continued)

FOREIGN PATENT DOCUMENTS

| EP | 1 835 263 A1 | 9/2007 |
| WO | WO 2004/113930 A1 | 12/2004 |
| WO | WO 2008/107737 A1 | 9/2008 |

OTHER PUBLICATIONS

European Search Report issued on Dec. 8, 2011 in corresponding European Application No. 11 17 2424 filed on Jul. 1, 2011 (with an English Translation).
H. Leuthold et al., "An ASIC for High-resolution Capacitive Microaccelerometers", Sensors and Actuators, A21-A23 (1990), pp. 278-281.

(Continued)

*Primary Examiner* — Bryan Bui
(74) *Attorney, Agent, or Firm* — Oblon, McClelland, Maier & Neustadt, L.L.P.

(57) ABSTRACT

A method for reducing the non-linearity effect of a digital-analog converter on an electronic interface circuit of a capacitive sensor. The electronic circuit includes an amplifier connected to the common electrode by a switching unit, a logic unit connected to the amplifier for supplying first and second digital measuring signals, and a digital-analog converter for supplying a measuring voltage to the electrodes. The method includes firstly biasing the capacitor electrodes by the measuring voltage, then biasing the fixed electrode of the first capacitor at a regulated voltage and the fixed electrode of the second capacitor at a low voltage, then biasing the capacitor electrodes by the measuring voltage, and finally biasing the fixed electrode of the first capacitor at a low voltage and the fixed electrode of the second capacitor at a regulated voltage.

10 Claims, 3 Drawing Sheets

(56) References Cited

U.S. PATENT DOCUMENTS

2010/0259285 A1 10/2010 Koli et al.
2011/0154906 A1* 6/2011 Grosjean et al. ............... 73/771

OTHER PUBLICATIONS

Yen S. Yee et al., "A 1 mV MOS Comparator", IEEE Journal of Solid-State Circuits, vol. SC-13, No. 3, Jun. 1978, pp. 294-297.

* cited by examiner

METHOD FOR REDUCING NON-LINEARITY DURING MEASUREMENT OF A PHYSICAL PARAMETER AND ELECTRONIC CIRCUIT FOR IMPLEMENTING THE SAME

This application claims priority from European Patent Application No. 11172424.1 filed Jul. 1, 2011, the entire disclosure of which is incorporated herein by reference.

FIELD OF THE INVENTION

The invention concerns a method for reducing the non-linearity effect of a DAC converter in a control loop during measurement of a physical parameter by means of a capacitive sensor electronic interface circuit. The physical parameter may concern an acceleration, angular speed, force or pressure.

The invention also concerns a capacitive sensor electronic interface circuit for implementing the method for reducing the non-linearity effect of the DAC converter. The capacitive sensor is formed of at least two differential connected capacitors. A common electrode of the capacitors is capable of moving between two fixed electrodes under the action, for example, of a force in order to alter the capacitive value of each capacitor.

BACKGROUND OF THE INVENTION

In a simple conventional capacitive sensor design, the common electrode, which is mobile, forms part of an armature resiliently held between the two fixed electrodes. In this case, the capacitive sensor may be capable of performing a measurement along one direction of movement of the moving electrode. The moving electrode can move some distance in the direction of one or other of the fixed electrodes under the action of a force.

With this type of sensor with a single measurement axis, the common electrode is at rest at an approximately equal distance from the two fixed electrodes, which defines equal capacitive values for the two capacitors. However, when the common electrode moves under the action, for example, of a force, the capacitive value of each capacitor varies inversely. The electronic interface circuit connected to the capacitive sensor thus enables an analogue output signal to be supplied. This analogue output signal takes the form of a voltage dependent on the capacitance variation of the two capacitors.

This type of electronic interface circuit for a capacitive sensor is disclosed, for example, in the article by Messrs H. Leuthold and F. Rudolph, which appeared in the journal entitled "Sensors and actuators" A21-23 (1990), pages 278 to 281.

The capacitive sensor may be an accelerometer for performing an acceleration measurement in conjunction with an electronic interface circuit. It may be a single axis accelerometer like the aforementioned capacitive sensor, or a multi-axis or tri-axis accelerometer for performing a measurement in three directions X, Y and Z. A tri-axis MEMS accelerometer of this type may include a single mass, i.e. a common inertial mass for the three pairs of differential capacitors, or three masses for the pairs of capacitors. In the first case, a single common electrode and six fixed electrodes are provided, whereas in the second case, one common electrode with two fixed electrodes are provided for each pair of capacitors.

For a conventional electronic interface circuit for a capacitive sensor, such as a single or tri-axis MEMS accelerometer, the output voltage ideally varies in a linear manner in relation to the movement of the common moving electrode. However, since the electronic circuit is generally integrated in a semiconductor substrate, account must be taken of stray capacitances at the input, which are added to the capacitances of the sensor capacitors. These stray capacitances are practically independent of the movement of the common electrode, which creates non-linearities. Thus, the electronic circuit output voltage does not vary linearly relative to the movement of the common moving electrode. These stray capacitances also have the effect of reducing the sensitivity or gain of the electronic circuit.

The MEMS sensor serving as accelerometer is also integrated in a semiconductor substrate, such as a silicon substrate. This also leads to a problem of non-linearity linked to the substrate potential during operation of the sensor. The substrate potential is difficult to control across the entire structure of said sensor, since the substrate is never totally conductive. The moving electrode of the sensor can also be in a shifted position relative to the fixed electrodes in the idle mode, which can create a measuring error without calibration. Because of these non-linearities, the measured electrostatic force is not zero in the sensor and electronic circuit idle mode. Because of the influence of the substrate potential on the electrostatic force, this leads to a variation in the measured real force, which is applied across the common moving electrode, which is a drawback.

Generally, to carry out a force, acceleration or pressure measurement using the electronic circuit, the fixed electrodes of two capacitors or pairs of capacitors are biased or excited cyclically by voltages of opposite polarity relative to an idle reference voltage. By biasing or polarizing the two fixed electrodes at different voltage levels, the charge difference across the moving electrode can be measured and converted into at least one electronic circuit output voltage. When the output voltage or voltages are stabilised at their final value, the total charge across the moving electrode becomes zero. These output voltages can be supplied sampled to a processing circuit capable of providing acceleration, force, pressure or also angular speed data depending upon the structure of the sensor.

It is to be noted that conventionally with an integrated capacitive sensor electronic interface circuit, the measurement of a force, acceleration or pressure is dependent upon the aforementioned non-linearities and any offset voltage linked to unmatched electronic components. A solution for overcoming this problem has already been proposed in EP Patent Application No. 1 835 263.

In EP Patent Application No. 1 835 263, the electronic circuit performs a measurement of a physical parameter, such as an acceleration, by means of a capacitive sensor, which only includes one pair of capacitors operating in differential mode. The common electrode is connected to a conventional charge transfer amplifier, whose output is connected to a first integrator, which supplies a first analogue output voltage in a first series of measuring phases, and to a second integrator, which supplies a second analogue output voltage in a second successive series of measuring phases. This electronic circuit is thus formed of a double symmetrical structure with the two integrators and also two excitation units for the fixed electrodes operating alternately in total symmetry.

Thus, in the first series of phases, the fixed electrodes are both biased by the first output voltage and biased by the high and low voltage levels of a voltage source. In the second series of phases, the fixed electrodes are both biased by the second output voltage and biased inversely to the first series of phases by the low and high voltage levels of the voltage source. Because of this, a voltage offset due to technology or to the variation in supply voltage can be minimised or eliminated using the two analogue integrator output voltages. Moreover, the substrate potential is no longer of any great importance given that the electronic circuit is designed with an identical double structure operating in total symmetry.

However, one drawback of this type of electronic circuit of EP Patent Application No 1 835 263 is that it supplies output signals, such as output voltages, in analogue form. This requires the use of two integrators. In these conditions, it is not possible to significantly reduce the size of the integrated components and the electric power consumption of the electronic circuit if the circuit is intended to be integrated in a silicon substrate using CMOS technology of 0.18 µm or less. Moreover, the electronic circuit is only arranged to be connected to one pair of capacitors of a capacitive sensor with a single measurement axis.

WO Patent Application No. 2004/113930, which discloses an electronic circuit connected to a single axis or multi-axis capacitive sensor for measuring acceleration, can be cited in this regard. In relation to the aforementioned electronic circuit, a specific logic for each measurement axis, which processes digital measuring signals, is provided after the charge transfer amplifier, which is connected to the common moving electrode. Each logic supplies at output a binary measuring signal representative of a measuring voltage level dependent on the movement of the moving electrode relative to the fixed electrodes for each axis in succession. The binary measuring signal is supplied for each axis in succession to a digital-analogue converter in a control loop. In one phase of each measuring cycle for a selected axis, this converter supplies a measuring voltage to the fixed electrodes alternately with a phase of biasing the fixed electrodes at a high voltage and a low voltage from a voltage source. With digital signal processing at the amplifier output, the size of the electronic components is reduced and also the electric power consumption of the electronic circuit output stages. However, nothing is provided for removing the afore-mentioned non-linearities and the non-linearities of the digital-analogue converter, which may be formed of an array of unmatched capacitors, which is a drawback. Moreover, the time for precisely stabilising the digital output signal for each measurement axis is relatively long, which is another drawback.

WO Patent Application No. 2008/107737, which discloses an electronic interface circuit for a measuring sensor and a method for activating the electronic circuit may also be cited. The measuring sensor is formed of two differential connected capacitors for measuring an acceleration. An analogue input signal for the measurement is stored after a charge transfer amplifier in one phase of a measuring cycle after the fixed electrodes of the capacitors have been biased. The analogue signal is then converted into a digital signal stored in a logic of the electronic circuit. The digital signal is subsequently converted by a digital-analogue converter into an analogue return signal in the form of a voltage, which is applied to all the sensor electrodes in a successive phase of each measuring cycle. In a measuring cycle, the fixed electrodes are biased a first time by a first biasing and a second time by a second biasing which is the reverse of the first biasing. This enables leakage currents to be removed from the electronic circuit. However, a large number of steps of the method are necessary to obtain a physical parameter measuring signal at output, which is a drawback. Moreover, nothing is provided to compensate for any non-linearities of the digital-analogue converter which may generate measuring errors, which is another drawback.

SUMMARY OF THE INVENTION

It is therefore an object of the invention to overcome the aforementioned drawbacks of the state of the art by providing a method for quickly and easily reducing non-linearity, particularly in a digital-analogue converter in a control loop, during measurement of a physical parameter in a capacitive sensor electronic interface circuit. When the electronic circuit is integrated, the size of the components can also be reduced.

The invention therefore concerns a method for reducing the non-linearity effect of a digital-analogue converter on an electronic interface circuit of a capacitive sensor for measuring a physical parameter, said capacitive sensor including at least two differential connected capacitors whose common electrode is capable of moving relative to each fixed electrode of the two capacitors to alter the capacitive value of each capacitor when the physical parameter is being measured, said electronic circuit including a charge transfer amplifier connected to the common electrode via a switching unit, a logic unit connected to the amplifier output for digital processing of the data supplied by the amplifier and for supplying digital measuring signals, and a digital-analogue converter capable of supplying a measuring voltage to the electrodes via the switching unit, the measuring voltage being defined on the basis of a binary word conversion defining at least one of the digital measuring signals, the method including, in each successive measuring cycle, steps consisting in:

a) biasing the electrodes of the capacitors via the switching unit with a measuring voltage supplied by the digital-analogue converter on the basis of a first digital measuring signal from a preceding cycle or a first initial binary word supplied by the logic unit, the first digital signal depending on a first biasing of the fixed electrodes of the capacitors, b) biasing the fixed electrode of the first capacitor at a regulated high voltage from a voltage source of the electronic circuit, and biasing the fixed electrode of the second capacitor at a low voltage from the voltage source, in order to adapt the first digital measuring signal in the logic unit, c) biasing the electrodes of the capacitors via the switching unit with a measuring voltage supplied by the digital-analogue converter on the basis of a second digital measuring signal from a preceding cycle or a second initial binary word supplied by the logic unit, the second digital signal depending on a second biasing which is the reverse of the first biasing of the fixed electrodes of the capacitors, and d) biasing the fixed electrode of the first capacitor at a low voltage from the electronic circuit voltage source, and biasing the fixed electrode of the second capacitor at a regulated high voltage from the voltage source, in order to adapt the second digital measuring signal in the logic unit, wherein initially, or during the physical parameter measuring cycles, a defined offset voltage is introduced into the digital-analogue converter to modify or modulate the first and second digital signals, and wherein a mean of the first and second digital signals is taken so as to supply a digital output signal relating to the physical parameter measurement with a reduction in the non-linearity effect of the digital-analogue converter.

Particular steps of the method are defined in the dependent claims 2 to 6.

One advantage of the method lies in the fact that a measurement is made of a physical parameter at a first offset reference voltage, which is different from zero and is added in the digital-analogue converter. The measurement of the physical parameter, such as an acceleration, is performed in a measuring cycle with, on the one hand, a positive biasing phase of the fixed electrodes, and on the other hand, with a negative biasing phase of the fixed electrodes, inverse to the positive biasing. A first digital signal dependent on positive integration and a second digital signal dependent on negative integration are stored in a logic unit. The mean of the two digital measuring signals is then taken to provide a digital output signal relating to the physical parameter measurement with a reduction in the non-linearity effect of the digital-analogue converter. Any offset value is removed at the output by adding together the first and second digital measuring signals. Each digital measuring signal is stored and refreshed in at least one specific register during all of the successive measuring cycles and for each measuring axis of the sensor. The points on each positive integration and negative integration measuring curve may also be stored in a specific memory of the logic unit.

Advantageously, several physical parameter measurements may be taken for several different successive offset voltages, and added in succession to an operational transconductance amplifier (OTA) of the digital-analogue converter. The points on each positive integration and negative integration measuring curve for each offset voltage are stored. 2 to 5 offset voltage values may be applied so as to average an output mean on all the measured curves and supply a digital output signal with a great reduction in the non-linearity effect of the digital-analogue converter.

The invention therefore also concerns an electronic interface circuit for a capacitive sensor for implementing the method for reducing the non-linearity effect of the digital-analogue converter. The electronic interface circuit for a capacitive sensor, which includes a pair of differential connected capacitors for implementing the method according to claim 1, the electronic circuit including a charge transfer amplifier connected to the common electrode via a switching unit, a logic unit connected to the amplifier output for digital processing of the data supplied by the amplifier and for supplying first and second digital measuring signals, dependent respectively on a first biasing of the fixed electrodes of the capacitors and a second biasing which is the reverse of the first biasing, and a digital-analogue converter capable of supplying a measuring voltage to the electrodes via the switching unit, the measuring voltage being defined on the basis of a binary word conversion relating to the first digital measuring signal or the second digital measuring signal, wherein the digital-analogue converter of the electronic circuit includes an electronic assembly capable of introducing a defined offset voltage into the converter to modify or modulate the first and second digital signals in the logic unit so as to reduce the non-linearity effect of the converter for the measurement of a physical parameter.

Specific embodiments of the electronic circuit are defined in the dependent claims 8 to 10.

One advantage of the physical sensor electronic interface circuit lies in the fact that it can quickly provide stabilised digital measuring signals at output owing to digital processing immediately after the charge transfer amplifier. These digital measuring signals are processed in the logic unit. Two digital signals depending on positive biasing and negative biasing of the fixed electrodes of the pair of capacitors are provided in the logic unit. Combining the positive and negative digital signals removes any voltage offset deliberately added to reduce the non-linearity effect of the digital-analogue converter. Thus, the non-linearity of the converter caused by non-matching capacitors in the array of capacitors of the digital-analogue converter is partly compensated by the measurements at at least one added offset voltage which is not zero. This reduces the non-linearity of the electronic interface circuit for a more precise measurement of an acceleration by the electronic circuit.

BRIEF DESCRIPTION OF THE DRAWINGS

The objects, advantages and features of the method for reducing the non-linearity effect of the digital-analogue converter on the capacitive sensor electronic interface circuit, and said electronic circuit for implementing the method will appear more clearly in the following description with reference to the drawings, in which.

DETAILED DESCRIPTION OF THE PREFERRED EMBODIMENTS

Since various components of the sensor electronic interface circuit with differential capacitors are well known in this technical field, they will not all be explained in detail in the following description. Emphasis is mainly placed on the method for measuring a physical parameter by means of an electronic circuit which supplies digital measuring signals at output with a reduction in the non-linearity effect of the digital-analogue converter.

Figure 1:
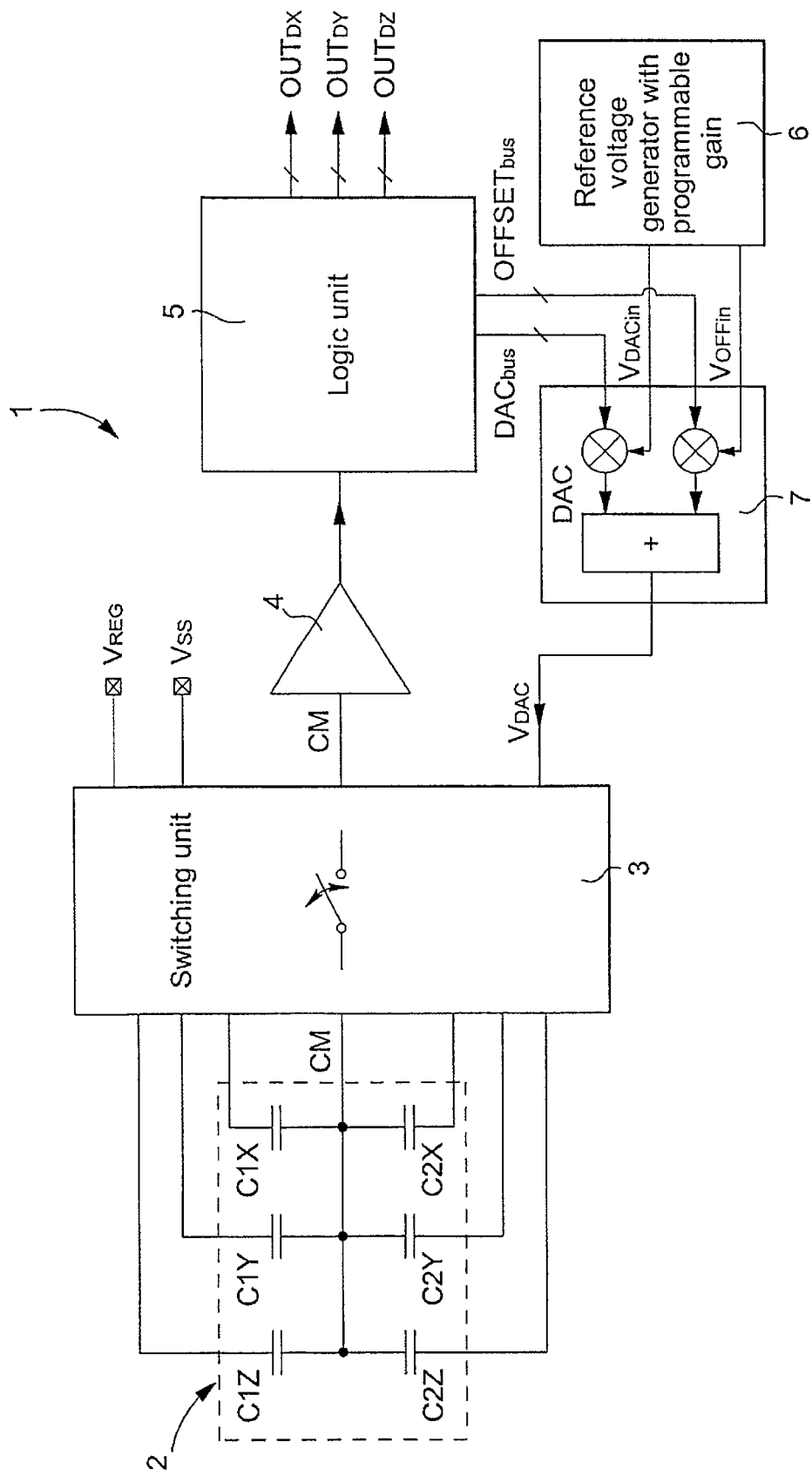
FIG. 1 shows in a simplified manner a capacitive sensor electronic interface circuit for implementing the method for reducing the non-linearity effect of the digital-analogue converter according to the invention.

FIG. 1 shows a simplified diagram of the various components of electronic interface circuit 1 for a capacitive sensor 2 according to the invention. In this embodiment, a tri-axis capacitive MEMS sensor 2 with a single mass is connected to electronic circuit 1, although it is entirely possible to envisage connecting a tri-axis sensor with three moving masses or a single axis sensor. This capacitive sensor is thus formed of three pairs of capacitors C1X, C2X, C1Y, C2Y, C1Z and C2Z. The two capacitors of each pair are differential connected. A common electrode CM of the pairs of capacitors is capable of moving under the action of a force between two fixed electrodes of each pair of capacitors to make a measurement taking account of the three axes X, Y and Z. Electronic circuit 1 can supply digital measuring signals for each axis, which relate to a physical parameter, such as an acceleration, angular speed, pressure or force, as a function of the movement of the common moving electrode. In the case of an acceleration measurement, the electronic circuit can be configured to supply digital measuring signals between minimum and maximum acceleration values. It is possible, for example, to choose to configure the electronic circuit to supply digital measuring signals within the acceleration range of −2 g to +2 g. A voltage variation of around 3 to 20 mV can be counted for 1 g of acceleration.

Moving electrode CM may form part of the armature of a sensor resiliently held in a central position at rest between the two fixed electrodes of each pair of capacitors C1X, C2X, C1Y, C2Y, C1Z and C2Z. Electronic circuit 1 may be powered by a continuous voltage source (not shown), which supplies a regulated high voltage $V_{REG}$ at a first terminal and a low voltage $V_{SS}$ at a second terminal. The low voltage can be defined at 0 V, whereas the regulated high voltage can be set at 1.65 V for example. The fixed electrode of each capacitor can be biased in a measuring cycle phase, either at high voltage $V_{REG}$ or at low voltage $V_{SS}$ in an operating mode of the electronic circuit. Consequently, since the two capacitors C1X, C2X, C1Y, C2Y, C1Z and C2Z of each pair have an equal capacitive value when sensor 2 is at rest, the voltage across common electrode CM is preferably equal at rest to an intermediate voltage $V_{REG}/2$ between regulated voltage $V_{REG}$ and low voltage $V_{SS}$ at 0 V.

The digital measuring signals supplied by electronic circuit 1 are proportional for two capacitors C1 and C2 at (C1−C2)/(C1+C2). Once the digital measuring signals are stabilised at a final physical parameter measurement, any charge flow across the two capacitors of each pair is cancelled out. Thus the object of the electronic circuit consists in finding a voltage to apply across each fixed electrode in a charge equalising phase, which satisfies $(V_{REG}-V_{DAC}) \cdot C1 = (V_{DAC}-V_{SS}) \cdot C2$. This is achieved when $V_{DAC} = (V_{REG}/2) \cdot (1+(C1-C2)/(C1+C2))$.

Electronic circuit 1 includes a comparator type charge transfer amplifier 4, which is directly connected to moving electrode CM of the capacitors via a switching unit 3. Switching unit 3 receives voltages $V_{REG}$, $V_{SS}$ and $V_{DAC}$ to be applied to the sensor electrodes in accordance with the measuring cycle phases. Regulated voltage $V_{REG}$ and low voltage $V_{SS}$ are applied to the fixed electrodes, whereas voltage $V_{DAC}$, from a digital-analogue converter 7 in inverse feedback, is applied to all the electrodes. The digital-analogue converter includes at least one array of capacitors for performing the digital-analogue conversion. However, all of these capacitors, which have respective capacitive values corresponding to powers of 2 (1, 2, 4, 8, 16, . . . , 64, . . . , 256) generally cannot all be properly matched. This converter therefore includes an electronic assembly for reducing the non-linearity effect of the converter for a physical parameter measurement as explained below with reference to FIG. 2.

Comparator amplifier 4 is of very simple design of the type disclosed in the article entitled "A 1 mV MOS Comparator" in the journal IEEE, J. Solid-State Circuits, vol. SC-13. pp. 294-297 of June 1978. This comparator amplifier 4 generally includes a capacitor at input connected to common electrode CM, followed by amplifier stages for supplying an all-or-nothing digital signal at output. This charge transfer amplifier has a very high gain. The amplifier output signal is at the "1" state close to regulated voltage $V_{REG}$ when the voltage across moving electrode CM increases via the accumulation of positive charges in the measuring cycles. However, the amplifier output signal changes to the "0" state close to low voltage $V_{SS}$ when the voltage across moving electrode CM decreases via the accumulation of negative charges in the measuring cycles.

Electronic circuit 1 also includes a logic unit 5, which includes storage means, a processor clocked by a conventional clock signal, at least one counter connected to the processor and several registers for storing binary measuring words for each measurement axis. There are two registers (not shown) per measurement axis, which means six registers for the three measurement axes. For each axis, a first register receives a first digital measuring signal from a defined positive biasing (pol at "0") of the fixed electrodes of the corresponding pair of capacitors, whereas a second register receives a second digital measuring signal from a defined negative biasing (pol at "1") of the fixed electrodes of the corresponding pair of capacitors. As explained below, the negative biasing is simply the reverse biasing of the positive biasing. By combining or adding the two registers per measurement axis, this enables logic unit 5 to supply a digital output signal $OUT_{DX}$, $OUT_{DY}$, $OUT_{DZ}$, from which any voltage offset has been removed.

The digital measuring signal of each register can be a binary word for example in 10 bits. The counter, in conjunction with the processor, enables a "1" state or a "0" state to be placed in one binary word position on the basis of the signal supplied by comparator amplifier 4. According to the measuring method, a dichotomy algorithm may be used for the first measuring cycles before a final value is obtained. It is thus the most significant bits that are altered in each register to start the dichotomy algorithm stored in the storage means. In the dichotomy phase, the bit counter has to change in accordance with bit=comp XNOR pol, where comp is the output value of comparator amplifier 4 and pol defines the positive biasing or negative biasing. The binary word of each register is adapted in each successive measuring cycle and for each axis.

Each binary word DACbus of the registers is supplied in succession in each measuring cycle to a DAC digital-analogue converter 7 to convert the binary word DACbus into an output voltage $V_{DAC}$. This DAC output voltage allows all of capacitors C1X, C2X, C1Y, C2Y, C1Z, C2Z and CM to be discharged in one of the measuring cycle phases to a voltage value dependent on the binary word DACbus of a particular axis. Binary word DACbus is multiplied in a first multiplier in digital-analogue converter 7 by a reference voltage $V_{DACin}$, which comes from a reference voltage generator with a programmable gain 6. This reference voltage can be supplied by means of a resistive divider connected between regulated voltage $V_{REG}$ and earth $V_{SS}$. As explained below with reference to FIG. 2, two reference voltages $V_{DACin}$ are provided for positive integration and for negative integration. The first multiplier is preferably defined as an OTA amplifier as explained in FIG. 2 below with a modulation offset voltage provided for reducing the non-linearity of the converter.

Logic unit 5 also supplies a binary adjusting word OFFSETbus (10 bits) for an offset voltage relating to the MEMS sensor at input. This binary adjusting word OFFSETbus is multiplied in a second multiplier in digital-analogue converter 7 with an adjusting voltage $V_{OFFin}$, which comes from programmable gain reference voltage generator 6. This adjusting voltage $V_{OFFin}$ can also be obtained by means of a resistive divider connected between regulated voltage $V_{REG}$ and earth $V_{SS}$. The output voltages of the two multipliers of converter 7 are then added so that the digital-analogue converter supplies voltage $V_{DAC}$ at output. A preliminary calibrating step for correcting this MEMS sensor voltage offset can be performed before the physical parameter is measured by electronic circuit 1.

Since binary words DACbus and OFFSETbus are over 10 bits from 0 to 1023, output voltage $V_{DAC}$ from a positive biasing (polarity "0") of the fixed electrodes and a negative biasing (polarity "1") of the fixed electrodes, can be expressed. These two equations eq(0) and eq(1) of the two voltages $V_{DAC}$ are expressed as follows:

$$V_{DAC}(0)=V_{REG}/2+V_{DACoffset}+(DACbus(0)-512) \cdot K_{DAC} \cdot V_{REG}+(OFFSETbus-512) \cdot K_{OFF} \cdot V_{REG} \quad eq(0)$$

$$V_{DAC}(1)=V_{REG}/2+V_{DACoffset}-(DACbus(1)-512) \cdot K_{DAC} \cdot V_{REG}-(OFFSETbus-512) \cdot K_{OFF} \cdot V_{REG} \quad eq(1)$$

$K_{DAC}$ is a factor that defines the system gain. This gain can be programmable for example by generating a voltage $V_{DACin}$ which comes from a resistive divider of the reference voltage generator 6. $K_{OFF}$ is a factor which defines the gain of the adjusting circuitry of the MEMS sensor voltage offset. This gain can be adapted in accordance with the desired adjusting range for example by generating a voltage $V_{OFFin}$ which comes from another resistive divider of the reference voltage generator 6. DACbus(0) defines the 10-bit binary word which comes from a first register of logic unit 5, which is applied to DAC converter 7 during the positive biasing phases. This binary word is defined from 0 to 1023. DACbus(1) defines the 10-bit binary word which comes from a second register of logic unit 5, which is applied to DAC converter 7 during the negative biasing phases. This binary word is defined from 0 to 1023. At the point of equilibrium in the rest position, the code of each DACbus is defined with the 10-bit code "1000000000" for a value 512, which has to define the intermediate voltage $V_{REG}/2$ without voltage offset. OFFSETbus defines the 10-bit binary adjusting word which is applied to DAC converter 7 to correct the voltage offset linked to the MEMS sensor. $V_{DACoffset}$ represents the noise voltage offset of DAC converter 7 which it is desired to remove.

It is also to be noted that DACbus(0) may be different from DACbus(1) if an acceleration is being measured, since these binary words depend on the state of biasing applied to the fixed electrodes. However, OFFSETbus does not depend in any way on the biasing applied to the fixed electrodes. Thus OFFSETbus is permanently selected after the preliminary step of calibrating the MEMS sensor linked to the electronic circuit as indicated above. This binary adjusting word can be stored in the storage means of logic unit 5.

To perform a measurement of a physical parameter such as, for example, an acceleration, a measuring cycle is generally formed of 12 successive phases. In the 12 successive phases, there is one positive biasing of the fixed electrodes of the three pairs of capacitors, and one negative biasing of the fixed electrodes of the three pairs of capacitors. Between each biasing phase, a voltage $V_{DAC}$ is applied across fixed electrodes C1X, C2X, C1Y, C2Y, C1Z, C2Z according to each successive binary word of the registers of logic unit 5. The duration of each phase may be on the order of 2 µs. In a phase called P0, all of the capacitor electrodes are biased with voltage $V_{DAC}$ relating to one of the measuring axes. In a phase called P1, a positive biasing is applied across the fixed electrodes of the capacitors of one of the measuring axes for the first half-period of a cycle, or a negative biasing for the second half-period of a measuring cycle. There are three phases P1 per half-period of the measuring cycle for each respective measuring axis.

Several cycles of 12 phases are repeated in succession to take the physical parameter measurement such as an acceleration by means of the tri-axis sensor. One conversion for a measurement axis corresponds to 16 charge transfers. The duration of the conversion for the three measurement axes may be less than 500 µs if each phase has a duration of around 2 µs or less. The dichotomy algorithm may be used in the first 8 measuring cycles, whereas oversampling may be used for the next 8 measuring cycles.

Figure 2:
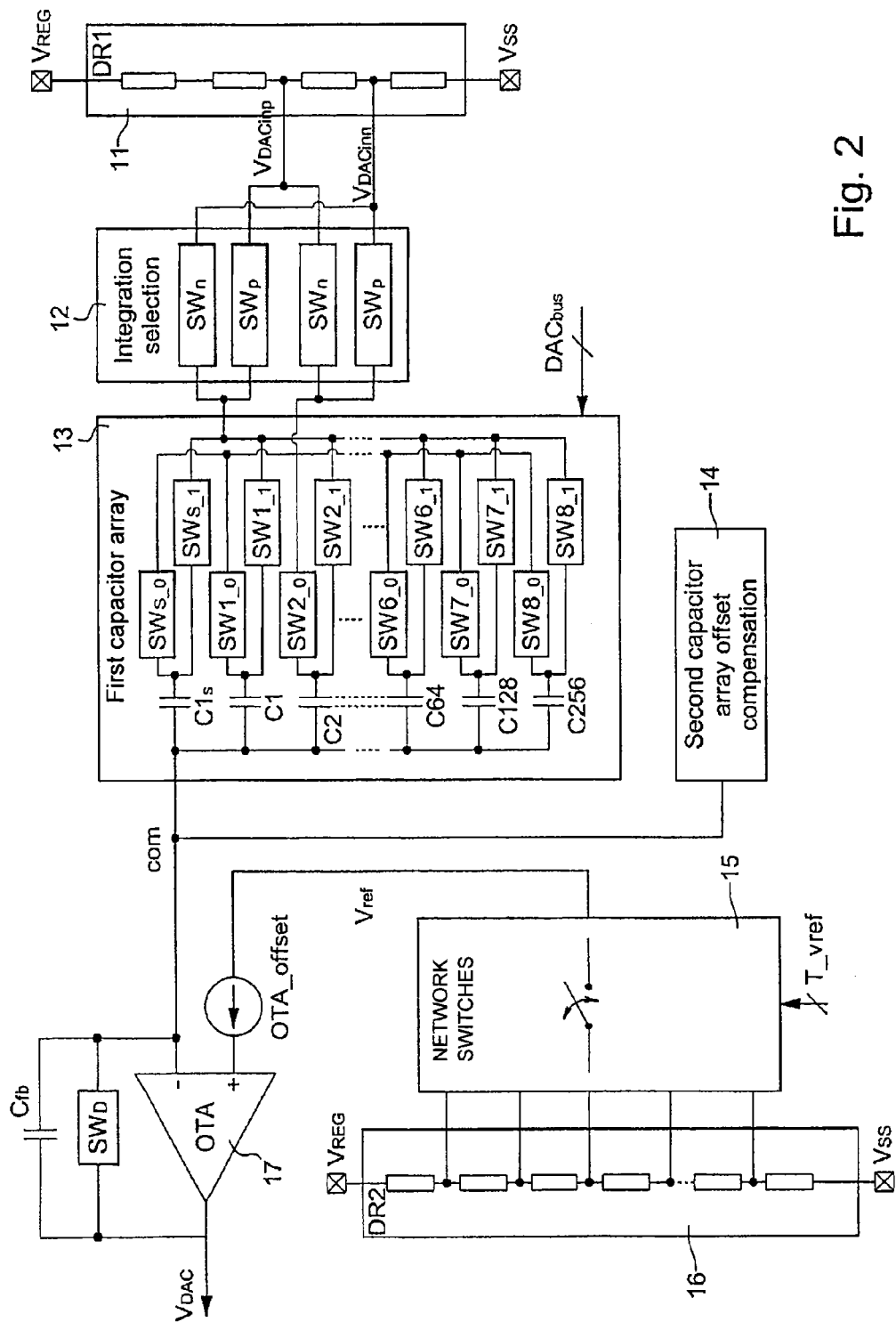
FIG. 2 shows an embodiment of one part of the digital-analogue converter of the electronic circuit with an electronic assembly for reducing the non-linearity effect of the converter for measuring a physical parameter.

In order to understand the method for reducing the non-linearity effect of the digital-analogue converter on the electronic circuit, reference may be made to FIG. 2, which shows one part of the converter with an electronic assembly for reducing the non-linearity of the converter for measuring a physical parameter. Non-linearity in the digital-analogue converter generates non-linearity in the acceleration transfer function (digital value) according to the acceleration to be measured by the capacitive sensor. This part of the converter of FIG. 2 does not include the multiplier of the binary OFFSETbus adjusting word of the MEMS sensor with an adjusting voltage $V_{OFFin}$, which comes from programmable gain reference voltage generator 6.

It is to be noted firstly that the most important characteristic of this electronic circuit is that the digital value of each digital measuring signal, which represents the acceleration does not depend on any electronic offset. Indeed, the digital values provided by the DACbus at the end of each positive and negative phase are, for example, within the range of +/−2 g data for 1 g of acceleration according to the following equations:

$$DAC\_Ap = 512 - \text{offset} + 128 \text{(positive counter)}$$

$$DAC\_An = 512 + \text{offset} + 128 \text{(negative counter)}$$

and $$\text{Digital\_acceleration} = DAC\_Ap + DAC\_An - 1024 = \\ (512 - \text{offset} + 128) + (512 + \text{offset} + 128) - 1024 = 256$$

If the analogue part of the electronic interface circuit of the capacitive sensor works instead within the range of +/−4 g, and if the full scale is reduced to 2 g by a multiplication by 2 of the digital code, 1 g of acceleration is defined according to the following equations:

$$DAC\_Ap = 512 - \text{offset} + 64 \text{(positive counter)}$$

$$DAC\_An = 512 + \text{offset} + 64 \text{(negative counter)}$$

and $$\text{Digital\_acceleration} = 2 \cdot (DAC\_Ap + DAC\_An - 1024) = 256$$

It will be noted that the values of Digital_acceleration do not depend in any way on the offset present or added to the electronic circuit, and that for Digital_acceleration values just below 1 g, the DACbus code may be 512+63 if the offset is equal to 0.

The above equations are only correct if the DAC converter is perfectly linear. If the DAC converter is made with a weighted capacitor technique, several non-linearities appear mainly when the most significant bits (MSB) of the DACbus codes are changed.

The digital-analogue converter therefore includes an OTA 17 for supplying at output the measuring voltage $V_{DAC}$ to the electrodes of the capacitive sensor in each phase P0. A switch $SW_D$ and an integration capacitor Cfb in parallel connect the OTA output to a negative input of the amplifier in the control loop. In a phase P1 of the measuring cycle, the converter is in a reset phase, amplifier OTA is in follower mode, and the integration capacitor Cfb is short-circuited by the switch $SW_D$. In this phase P1, the electrodes of a pair of the MEMS sensor capacitors at input are biased with positive biasing or negative biasing. Each pair of capacitors is biased in succession in each phase P1 in a measuring cycle. However, in phase P0, the charges stored in the capacitors of the capacitive arrays are transferred into the signal corn and to capacitor Cfb, thus the output value $V_{DAC}$ is ready at the end of phase P0 to apply said voltage $V_{DAC}$ to all of the fixed electrodes of the MEMS sensor capacitors.

The digital-analogue converter further includes a first capacitor array 13 and a second offset compensation capacitor array 14, which is not described. One electrode of all of capacitors C1s, C1, C2, ..., C64, C128, C256 is connected to the negative input of OTA 17 by supplying a charge transfer signal corn. The other electrode of each capacitor of the first array 13 is connected via a first respective switch $SW_{S\_0}$, $SW_{1\_0}$, $SW_{2\_0}$, $SW_{6\_0}$, $SW_{7\_0}$, $SW_{8\_0}$ and a second respective switch $SW_{S\_1}$, $SW_{2\_1}$, $SW_{6\_1}$, $SW_{7\_1}$, $SW_{8\_1}$ to a unit for selecting positive and negative integration 12. These switches are both used in the positive and negative biasing, but their switching order is reversed according to the sign of the binary word DACbus supplied by the logic unit.

The first capacitor array 13 is thus used in the control loop and controlled by the 10-bit binary word DACbus from the logic unit. This binary word DACbus is supplied by each of the 6 registers after the positive biasing and negative biasing and for each axis in succession. The capacitors of the first array have values corresponding to powers of 2. The size of each capacitor is normally set on the basis of a specific capacitor C1, with the capacitive value C2 equal to 2·C1, up to the capacitive value of C256 equal to 256·C1. Capacitor C1s has a capacitive value corresponding to the capacitive value of C1. This capacitor C1s and the two switches $SW_{S\_0}$, $SW_{S\_1}$ are used for the "1000000000" DACbus codes (negative value) and there is a shift of −1 LSB when the code "0111111111" is active relative to code "1000000000", otherwise these two codes would not match any charge transfer. Capacitors C1 to C256 are generally not well matched and do not correspond exactly to the real power of 2 value relative to the capacitive value of the single capacitor C1. This therefore creates non-linearity in the control loop according to the acceleration measured by the MEMS capacitive sensor at the input of the electronic circuit interface. For example, the large capacitor C64, whose value should be 64·C1 may actually have a value C66 instead of C64, which leads to an error in the control loop for the acceleration measurement, particularly during the transition from C63 (C1+C2+C4+C8+C16+C32) to C64.

The positive and negative integration selection unit 12 includes two switches SWp for positive biasing and two switches SWn for negative biasing. Two reference voltages $V_{DACinp}$ and $V_{DACinn}$ from a first resistive divider DR1 11, which may be in the reference voltage generator, are supplied to selection unit 12. This first resistive divider DR1 11 is connected between $V_{REG}$ and $V_{SS}$. When there is negative integration, the reference voltage $V_{DACinp}$ is supplied to the switches $SW_{S\_0}$, $SW_{1\_0}$, $SW_{2\_0}$, $SW_{6\_0}$, $SW_{7\_0}$, $SW_{8\_0}$ of the first capacitor array, whereas reference voltage $V_{DACinn}$ is supplied to switches $SW_{S\_1}$, $SW_{2\_1}$, $SW_{6\_1}$, $SW_{7\_1}$, $SW_{8\_1}$. When there is positive integration, the reference voltage $V_{DACinn}$ is supplied to the switches $SW_{S\_0}$, $SW_{1\_0}$, $SW_{2\_0}$, $SW_{6\_0}$, $SW_{7\_0}$, $SW_{8\_0}$ of the first capacitor array, whereas reference voltage $V_{DACinp}$ is supplied to switches $SW_{S\_1}$, $SW_{1\_1}$, $SW_{2\_1}$, $SW_{6\_1}$, $SW_{7\_1}$, $SW_{8\_1}$. Thus, the voltages $V_{DACinn}$ and $V_{DACinp}$ applied to the switches are reversed between the positive and negative integrations. This allows the sign of the charges transferred sign to the converter signal "corn" to be reversed.

In order to reduce the non-linearity effect of the digital-analogue converter on the electronic circuit, a defined offset voltage dvref is also added to the reference voltage $V_{REG}/2$ of the voltage signal Vref supplied to the positive input of the OTA. Account must also be taken of the OTA offset, which is also added to this reference voltage signal and forms a source of noise voltage due to matching errors in the elements connected to the OTA. The defined offset voltage dvref added to voltage $V_{REG}/2$ is supplied via a second resistive divider 16, connected to an array of switches 15, which is controlled by 4-bit matching word T_vref. This array of switches may be a multiplexer connected to the resistors of the second resistive divider and controlled by the matching word T_vref. Each bit of this matching word can supply a voltage difference on the order of 3.3 mV. The selectable voltage range around $V_{REG}/2$ may be from −26.4 mV to +23.1 mV.

As shown hereinafter with reference to FIG. 3, it is normally sufficient to add or subtract a defined, non-zero, offset voltage dvref to or from voltage $V_{REG}/2$ in reference voltage Vref supplied to the positive input of OTA 17 in order to be able to reduce the non-linearity effect of the digital-analogue converter on the electronic circuit. Normally this defined offset voltage dvref must be greater or less than the OTA_offset voltage in order to have a reference voltage (offset) value at the positive OTA input which is different from $V_{REG}/2$. To achieve this, a mean can be taken of the positive integration curve with the digital values from the corresponding logic unit registers and the negative integration curve. Thus the error due to improper matching of one or other capacitor of the first capacitor array is reduced by half. Preferably, several measurements are carried out at different offset voltages dvref to determine, for example, several curves, for example five measurement curves. The mean of these five curves enables the non-linearity effect of the digital-analogue converter on the electronic circuit to be reduced even further. Because of the positive biasing and negative biasing, any offset dvref added to or subtracted from the voltage $V_{REG}/2$ is, of course, removed from the logic unit digital output signals and only the acceleration value is determined in these digital signals.

For positive integration, the voltage $V_{DAC}$ supplied at the digital-analogue converter output is determined by the following equation:

$$V_{DAC}=V\text{ref}+\text{OTA\_offset}+(V_{DAC\_inp}-V_{DAC\_inn})\cdot(C1/Cfb)\cdot(\text{DACbus}-512)$$

$$V_{DAC}=V_{REG}/2+d\text{vref}+\text{OTA\_offset}+(V_{DAC\_inp}-V_{DAC\_inn})\cdot(C1/Cfb)\cdot(\text{DACbus}-512)$$

where DACbus is a 10-bit digital value and dvref is a voltage difference to be added to $V_{REG}/2$ in the reference voltage signal Vref.

The logic unit connected to the converter modifies DACbus, until charge balancing is achieved in the MEMS sensor and this occurs when:

$$V_{DAC}=V_{REG}/2\cdot(1+(C1-C2)/(C1+C2))$$

Therefore:

$$d\text{vref}+\text{OTA\_offset}+(V_{DAC\_inp}-V_{DAC\_inn})\cdot(C1/Cfb)\cdot(\text{DACbus}-512)=(V_{REG}/2)\cdot(C1-C2)/(C1+C2))$$

which results in:

$$\text{DACbus}=512+(Cfb/C1)\cdot((V_{REG}/2)\cdot(C1-C2)/(C1+C2)-(d\text{vref}+\text{OTA\_offset}))/(V_{DAC\_inp}-V_{DAC\_inn})$$

$$\text{DACbus}=512-(Cfb/C1)\cdot(d\text{vref}+\text{OTA\_offset})/(V_{DAC\_inp}-V_{DAC\_inn})+(Cfb/C1)\cdot((V_{REG}/2)\cdot(C1-C2)/(C1+C2))/(V_{DAC\_inp}-V_{DAC\_inn})$$

For negative integration, the voltage VDAC supplied at the digital-analogue converter output is determined by the following equation:

$$V_{DAC}=V_{REG}/2+d\text{vref}+\text{OTA\_offset}-(V_{DAC\_inp}-V_{DAC\_inn})\cdot(C1/Cfb)\cdot(\text{DACbus}-512)$$

and:

$$V_{DAC}=(V_{REG}/2)\cdot(1-(C1-C2)/(C1+C2))$$

Therefore:

$$d\text{vref}+\text{OTA\_offset}-(V_{DAC\_inp}-V_{DAC\_inn})\cdot(C1/Cfb)\cdot(\text{DACbus}-512)=-(V_{REG}/2)\cdot(C1-C2)/(C1+C2))$$

which leads to:

$$\text{DACbus}=512+(Cfb/C1)\cdot((V_{REG}/2)\cdot(C1-C2)/(C1+C2)+(d\text{vref}+\text{OTA\_offset}))/(V_{DAC\_inp}-V_{DAC\_inn})$$

$$\text{DACbus}=512+(Cfb/C1)\cdot(d\text{vref}+\text{OTA\_offset})/(V_{DAC\_inp}-V_{DAC\_inn})+(Cfb/C1)\cdot((V_{REG}/2)\cdot(C1-C2)/(C1+C2))/(V_{DAC\_inp}-V_{DAC\_inn})$$

The value (dvref+OTA_offset) corresponds to the electronic circuit offset. This value appears in the term (Cfb/C1)

·(dvref+OTA_offset)/($V_{DAC\_inp}$−$V_{DAC\_inn}$) with opposite signs for the positive and negative integrations. This generates an error in the final values of the DACbus codes for the positive and negative integrations. It is to be noted that the error in voltage Vref is equivalent to the OTA offset. Thus, it is possible to modulate the offset voltage by changing the value of the 4-bit adjusting word T_vref so as to change the reference voltage Vref supplied to the positive input of the OTA. By changing the offset voltage dvref, it is possible to change the DACbus codes (DAC_Ap and DAC_An) without changing the final acceleration value, which is a digital value generated by the addition of DAC_Ap and DAC-An. This offset voltage dvref may be changed several times in measuring cycles as a result of adjustment word T_vref. This allows several curves to be determined and then averaged to reduce as far as possible the effect of any non-linearity of the electronic circuit.

Figure 3:
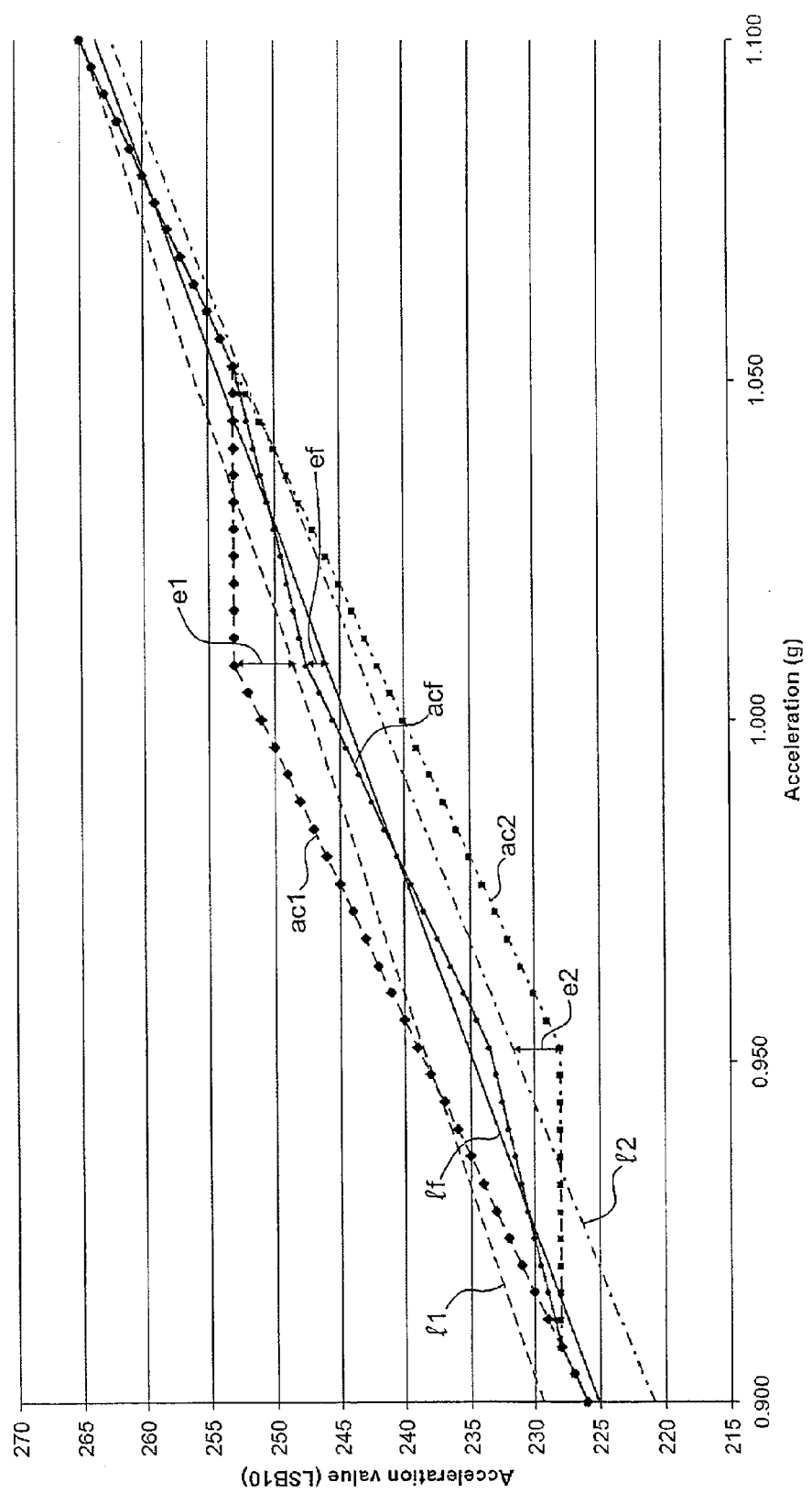
FIG. 3 shows a graph of the measured acceleration transfer function for positive integration and for negative integration and the resulting non-linearity reduction curve of the digital-analogue converter of the electronic circuit.

FIG. 3 shows a first curve ac1 of a positive integration, a second curve ac2 of a negative integration and a curve acf of the mean of the other two curves for reducing the non-linearity of the converter during measurement of an acceleration. The defined offset voltage dvref is selected with a value of 0.2 mV in FIG. 3. The first curve deviates by a maximum error e1 from the ideal curve 11 for an acceleration measurement on the order of 1 g. The second curve deviates by a maximum error e2 from the ideal curve 12 for an acceleration measurement of 1 g. The maximum error of the mean curve of the other two curves relative to an ideal curve If is only half compared to the maximum error e1 and e2 of the other two curves. Of course, if a mean is taken of several positive and negative integration curves, the maximum final error of the mean curve becomes minimal and the mean curve comes close to the ideal curve. Consequently, this efficiently overcomes any non-matching of the capacitors of the first capacitor array of the digital-analogue converter, which is an object of the present invention.

From the description that has just been given, those skilled in the art can devise multiple variants of the method for reducing the non-linearity effect of a digital-analogue converter on an electronic circuit for measuring a physical parameter, and the electronic interface circuit for the capacitive sensor for implementing said method without departing from the scope of the invention defined by the claims. It is possible to envisage altering the duration of each phase in relation to the other, or the duration of each cycle during the operations of determining the various curves to be averaged or the physical parameter measuring operations. The order of the positive and negative biasing can be altered in each measuring cycle. At least two additional phases of the electronic circuit operation test can also be placed in each measuring cycle.

What is claimed is:

1. A method for reducing the non-linearity effect of a digital-analogue converter on an electronic interface circuit of a capacitive sensor for measuring a physical parameter, said capacitive sensor including at least two differential connected capacitors whose common electrode is capable of moving relative to each fixed electrode of the two capacitors to alter the capacitive value of each capacitor when the physical parameter is being measured, said electronic circuit including a charge transfer amplifier connected to the common electrode via a switching unit, a logic unit connected to the amplifier output for digital processing of the data supplied by the amplifier and for supplying digital measuring signals, and a digital-analogue converter capable of supplying a measuring voltage to the electrodes via the switching unit, the measuring voltage being defined on the basis of a binary word conversion defining at least one of the digital measuring signals, the method including, in each successive measuring cycle, steps comprising:

a) biasing the electrodes of the capacitors via the switching unit with a measuring voltage supplied by the digital-analogue converter on the basis of a first digital measuring signal from a preceding cycle or a first initial binary word supplied by the logic unit, the first digital signal depending on a first biasing of the fixed electrodes of the capacitors, b) biasing the fixed electrode of the first capacitor at a regulated high voltage from a voltage source of the electronic circuit, and biasing the fixed electrode of the second capacitor at a low voltage from the voltage source, in order to adapt the first digital measuring signal in the logic unit, c) biasing the electrodes of the capacitors via the switching unit with a measuring voltage supplied by the digital-analogue converter on the basis of a second digital measuring signal from a preceding cycle or a second initial binary word supplied by the logic unit, the second digital signal depending on a second biasing which is the reverse of the first biasing of the fixed electrodes of the capacitors, and d) biasing the fixed electrode of the first capacitor at a low voltage from the electronic circuit voltage source, and biasing the fixed electrode of the second capacitor at a regulated high voltage from the voltage source, in order to adapt the second digital measuring signal in the logic unit, wherein initially, or during the physical parameter measuring cycles, a defined offset voltage is introduced into the digital-analogue converter to modify or modulate the first and second digital signals, and wherein a mean of the first and second digital signals is taken so as to supply a digital output signal relating to the physical parameter measurement with a reduction in the non-linearity effect of the digital-analogue converter.

2. The measuring method according to claim 1, wherein several defined offset voltages that are different from each other are introduced in successive measuring cycles in the digital-analogue converter, and wherein a mean is taken of the various first digital signals and the various second digital signals, in order to supply a digital output signal relating to the physical parameter measurement with a reduction in the non-linearity effect of the digital-analogue converter.

3. The measuring method according to claim 2, wherein each first digital signal and each second digital signal, based on one of the defined offset voltages introduced in succession into the digital-analogue converter, are stored in the logic unit.

4. The measuring method according to claim 1, wherein the digital-analogue converter includes a capacitor array controlled in succession by the binary word of a first register and by the binary word of a second register, an OTA amplifier connected at a negative input to one electrode of all the capacitors of the capacitor array, a switch and an integration capacitor in parallel connecting one output of the OTA amplifier to the negative input of the amplifier in a control loop, a positive input of the OTA amplifier receiving a defined offset voltage to modify the measuring voltage supplied at the output of the OTA amplifier in the measuring cycles, wherein the logic unit includes the first register for storing a first 10-bit-digital measuring signal following positive integration, and the second register for storing a second 10-bit digital measuring signal following negative integration, and a memory for storing the results of the physical parameter measurement in the measuring cycles.

5. The measuring method according to claim 1, wherein the capacitive sensor is of the tri-axis type with three pairs of differential connected capacitors with one common electrode per pair or for all the pairs and two fixed electrodes for each pair, and wherein the logic unit of the electronic circuit is capable of supplying first and second digital measuring signals for each measuring axis X, Y and Z, wherein the method for measuring a physical parameter includes 12 successive phases per measuring cycle, which include repeating steps a) and b) in succession during the first six phases for each axis X, Y, Z with the first digital signal corresponding to the selected axis, and repeating steps c) and d) in succession during the last six phases for each axis X, Y, Z with the second digital signal corresponding to the selected axis.

6. The measuring method according to claim 1, wherein the capacitive sensor is of the tri-axis type with three pairs of differential connected capacitors with one common electrode per pair or for all the pairs and two fixed electrodes for each pair, and wherein the logic unit of the electronic circuit is capable of supplying first and second digital measuring signals for each measuring axis X, Y and Z, wherein the method for measuring a physical parameter includes 12 successive phases per measuring cycle, which include performing steps a) to d) for the X axis with the first and second digital measuring signals of the X axis, performing steps a) to d) for the Y axis after the X axis with the first and second digital measuring signals of the Y axis, and finally performing steps a) to d) for the Z axis, after the Y axis, with the first and second digital measuring signals of the Z axis.

7. The electronic interface circuit for a capacitive sensor, which includes a pair of differential connected capacitors for implementing the method according to claim 1, the electronic circuit including a charge transfer amplifier connected to the common electrode via a switching unit, a logic unit connected to the amplifier output for digital processing of the data supplied by the amplifier and for supplying first and second digital measuring signals, dependent respectively on a first biasing of the fixed electrodes of the capacitors and a second biasing which is the reverse of the first biasing, and a digital-analogue converter capable of supplying a measuring voltage to the electrodes via the switching unit, the measuring voltage being defined on the basis of a binary word conversion relating to the first digital measuring signal or the second digital measuring signal, wherein the digital-analogue converter of the electronic circuit includes an electronic assembly capable of introducing a defined offset voltage into the converter to modify or modulate the first and second digital signals in the logic unit so as to reduce the non-linearity effect of the converter for the measurement of a physical parameter.

8. The electronic circuit according to claim 7, wherein the digital-analogue converter includes a capacitor array controlled in succession by the binary word of a first register and by the binary word of a second register, an OTA amplifier connected at a negative input to one electrode of all the capacitors of the capacitor array, a switch and an integration capacitor in parallel connecting one output of the OTA amplifier to the negative input of the amplifier in a control loop, a positive input of the OTA amplifier receiving a defined offset voltage supplied by the electronic assembly to modify the measuring voltage supplied at the output of the OTA amplifier in the measuring cycles.

9. The electronic circuit according to claim 8, wherein the electronic assembly includes a resistive divider connected between a high voltage and a low voltage from a voltage source, a switch array in the form of an analogue multiplexer connected at entry to different nodes of the resistive divider, and supplying at output the defined offset voltage on the basis of a binary adjustment word.

10. The electronic circuit according to claim 7, wherein it includes a reference voltage generator with a programmable gain for supplying programmed reference voltages to switches of a capacitor array via a positive or negative integration selection unit.

\* \* \* \* \*